(12) United States Patent
Ogata et al.

(10) Patent No.: US 7,849,989 B2
(45) Date of Patent: Dec. 14, 2010

(54) ONE-WAY CLUTCH

(75) Inventors: Hirofumi Ogata, Fukuroi (JP); Kazuhiko Muramatsu, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 530 days.

(21) Appl. No.: 11/776,024

(22) Filed: Jul. 11, 2007

(65) Prior Publication Data
US 2008/0047796 A1 Feb. 28, 2008

(30) Foreign Application Priority Data
Aug. 28, 2006 (JP) .............................. 2006-230214

(51) Int. Cl.
*F16D 41/06* (2006.01)

(52) U.S. Cl. .................... 192/45; 192/113.32

(58) Field of Classification Search ............. 192/113.32
See application file for complete search history.

(56) References Cited

U.S. PATENT DOCUMENTS

| | | | | |
|---|---|---|---|---|
| 3,087,589 A | * | 4/1963 | Gorsky ........................ | 192/45 |
| 4,874,069 A | * | 10/1989 | Lederman ..................... | 192/45 |
| 4,986,402 A | * | 1/1991 | Neuwirth et al. ............... | 192/45 |
| 5,056,636 A | * | 10/1991 | Lederman ..................... | 192/45 |
| 5,183,139 A | * | 2/1993 | Malecha ....................... | 192/45 |
| 5,879,254 A | * | 3/1999 | Tanaka ........................ | 474/74 |
| 6,044,945 A | * | 4/2000 | Muramatsu .................. | 192/45 |
| 6,279,708 B1 | | 8/2001 | Yatabe et al. | |
| 6,338,402 B1 | * | 1/2002 | Muramatsu et al. ........... | 192/45 |
| 6,530,464 B2 | * | 3/2003 | Ogata et al. ............ | 192/113.32 |
| 2003/0141161 A1 | * | 7/2003 | Ouchi ......................... | 192/45 |
| 2004/0079605 A1 | * | 4/2004 | Itoh et al. ..................... | 192/45 |

FOREIGN PATENT DOCUMENTS

JP 2004-251343 A 9/2004

* cited by examiner

*Primary Examiner*—David D Le
*Assistant Examiner*—Ryan Dodd
(74) *Attorney, Agent, or Firm*—Crowell & Moring LLP

(57) ABSTRACT

A one-way clutch is provided with an outer ring having a cylindrical wall on an inner circumference thereof, an inner ring having cam surfaces formed thereon, rolling elements arranged between the outer and inner rings to perform transmission of a torque between the outer and inner rings, and springs biasing the rolling elements, respectively. The inner ring is provided on its outer circumferential wall with recesses such that lube-oil receiving and accumulating parts are formed between the cylindrical wall of the outer ring and the outer circumferential wall of the inner ring.

7 Claims, 3 Drawing Sheets

ONE-WAY CLUTCH

FIELD OF THE INVENTION

This invention relates to a one-way clutch, which is useful as a backstop in a vehicle such as, for example, motorcycle or snowmobile.

BACKGROUND OF THE INVENTION

In general, a one-way clutch is equipped with an outer ring and an inner ring rotatable relative to each other, and can transmit a rotational torque in only one direction as a result of engagement of sprags, rollers or the like, which serve to transmit torques between the outer ring and the inner ring, with cam surfaces arranged on a raceway surface of the outer ring or inner ring. The one-way clutch is also constructed to idle whenever a rotational torque is applied in the reverse direction.

Such one-way clutches are known to include a one-way clutch constructed such that rolling elements such as rollers are arranged in pockets (recesses) formed in an inner ring or outer ring and depending on the direction of rotation, the rotation is locked by wedging action produced as a result of engagement of the rolling elements with cam surfaces of the pockets.

In JP-A-2004-251343, for example, lube oil is filled in pockets within which rollers are accommodated, and passages are formed to communicate the adjacent pockets with each other. The lube oil is, therefore, forced to flow out into the adjacent pockets via the passages so that the inner and outer rings and the rollers are positively lubricated at the areas of contact between them.

When a one-way clutch is used at a position to which oil such as engine oil or automatic transmission fluid (ATF) cannot be fed, mere filling of lube oil such as grease in pockets is generally unable to effectively feed the lube oil to slide surfaces, leading to a potential problem that abrasion may take place during high-speed rotation and during idling in high-vibration environments. The arrangement of communicating passages between pockets as in JP-A-2004-251343, therefore, was not always possible to provide a drastic solution. In particular, there is a problem that no sufficient lube oil can be fed to an inner circumferential wall of an outer ring during idling.

BRIEF SUMMARY OF THE INVENTION

An object of the present invention is, therefore, to provide a one-way clutch in which sufficient lube oil can be fed to the inner circumferential wall of an outer ring and slide surfaces of rolling elements even during idling of the one-way clutch.

In one aspect of the present invention, there is thus provided a one-way clutch provided with an outer ring having a cylindrical wall on an inner circumference thereof, an inner ring having cam surfaces formed thereon, rolling elements arranged between the outer and inner rings to perform transmission of a torque between the outer and inner rings, and springs biasing the rolling elements, respectively, wherein the inner ring is provided on an outer circumferential wall thereof with lube-oil receiving and accumulating parts to receive and accumulate lube oil.

Owing to the arrangement of the lube-oil receiving and accumulating parts to receive and accumulate lube oil, oil films can be retained in sliding areas between a raceway surface on an inner circumference of the outer ring and the respective rolling elements during idling of the one-way clutch, and moreover, cooling effect can be expected.

In addition, the increased space volume makes it possible to fill grease as lube oil in a greater amount and therefore, to lessen the heat degradation of grease.

DETAILED DESCRIPTION OF PREFERRED EMBODIMENTS

Figure 1:
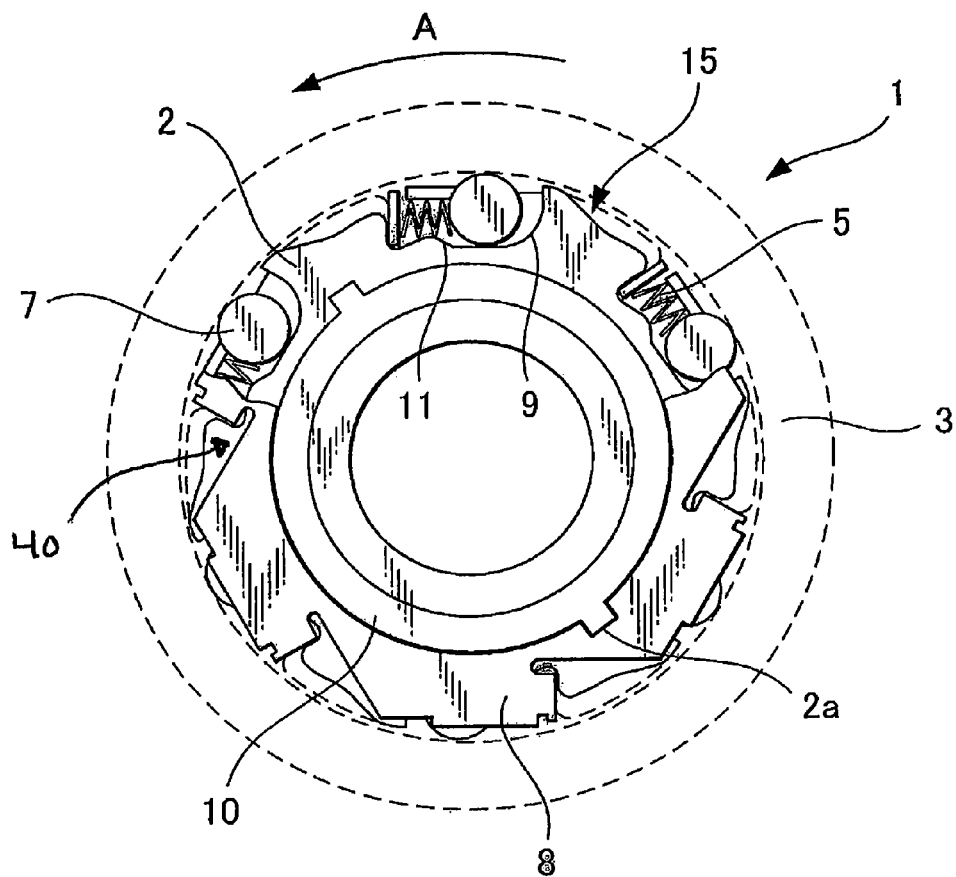
FIG. 1 is a front view of a one-way clutch according to a first embodiment of the present invention.

With reference to the accompanying drawings, preferred embodiments of the present invention will hereinafter be descried in detail. In the drawings, like reference numerals identify similar parts. It is also to be noted that these embodiments illustrate the present invention by way of example and should not be taken in any limiting sense.

First Embodiment

Referring first to FIG. 1, a one-way clutch according to a first embodiment of the present invention will be described. FIG. 1 illustrates a disengaged state that the one-way clutch 1 is idling.

As shown in FIG. 1, the one-way clutch 1 comprises an inner ring 2 and an outer ring 3. The inner ring 2 is a hollow shaft, which has spline grooves 2a cut and arranged on an inner circumference thereof and is fitted on a drive shaft 10. The outer ring 3 is arranged coaxially with the inner ring 2 on a radially outer side of the inner ring 2 such that the outer ring 3 and inner ring 2 are rotatable relative to each other. On an outer circumference of the inner ring 2, plural pockets 9 which open toward an inner circumferential wall of the outer ring 3 are arranged at equal angular intervals. Outer circumferential wall portions of the inner ring 2, said outer circumferential wall portions being located between the respective pockets 9, are formed as wall portions recessed relative to the inner circumferential wall of the outer ring 3, and act as lube-oil receiving and accumulating parts 15 for receiving and accumulating lube oil therein.

Each pocket 9 is provided at a part of its bottom wall with a cam surface 11. In each pocket 9, a rolling member for performing the transmission of a torque, specifically a substantially cylindrical roller 7 is disposed. In each pocket 9, there is also arranged a biasing spring 5 to bias the roller 7 in a direction that the cam surface 11 becomes deeper, specifically in a non-engaging direction that the roller 7 does not come into engagement between the cam surface 11 and the cylindrical inner circumferential wall of the outer ring 3 and the one-way clutch 1 idles.

The one-way clutch 1 is provided over axially opposite end walls thereof with side plates 8 to prevent the rollers 7 and springs 5 from falling off in an axial direction. Lube oil of relatively high viscosity, such as grease, is filled in the plural lube-oil receiving and accumulating parts 15. The lube-oil receiving and accumulating parts 15 are arranged between the respective pockets at equal angular intervals as recesses having a negative gradient in an idling direction A of the outer ring 3. In other words, the lube-oil receiving and accumulating parts 15 are inclined such that the recesses become narrower in the idling direction A of the outer ring 3.

Now assume that the outer ring 3 is used as a driving side in the one-way clutch 1 constructed as described above. When the outer ring 3 rotates in the direction of arrow A in FIG. 1, that is, idles, a raceway surface on the inner circumference of the outer ring 3 acts as a slide surface. During idling, the grease tends to stick on an outer circumferential side under centrifugal force. The lube-oil receiving and accumulating parts 15 are, therefore, arranged on the outer circumference of the inner ring 2 of the one-way clutch 1 to facilitate effective feeding of the grease to the slide surfaces of the rollers 7 in the respective pockets 9 during idling. In particular, the formation of the negative gradient in the idling direction A of the outer ring 3 assures more effective lubrication.

Second Embodiment

Figure 2:
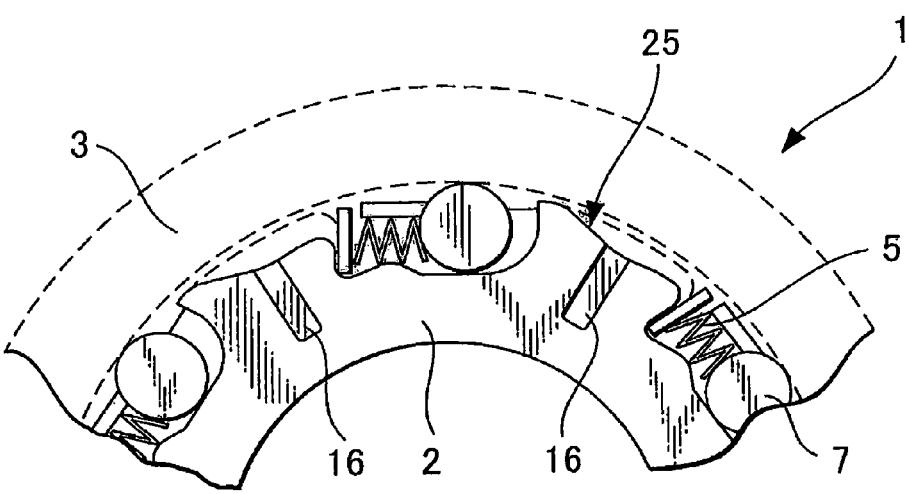
FIG. 2 is a fragmentary front view of a one-way clutch according to a second embodiment of the present invention.
Figure 3:
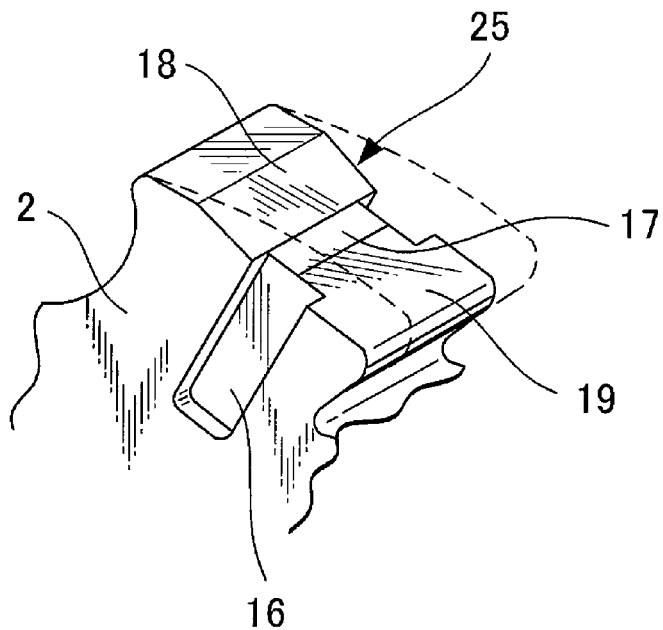
FIG. 3 is a fragmentary perspective view showing a grease receiving and accumulating part in FIG. 2.

Referring next to FIGS. 2 and 3, a one-way clutch according to a second embodiment of the present invention will be described. In the second embodiment, radially-extending grooves 16 are formed on axial end faces of the inner ring 2.

Each lube-oil receiving and accumulating part 25 is also provided with an axially-extending groove 17 in communication with its corresponding grooves 16. Similar to each lube-oil receiving and accumulating part 15 in the first embodiment, each lube-oil receiving and accumulating part 25 is arranged in the form of a recess as a whole. Further, each lube-oil receiving and accumulating part 25 is inclined such that the recess becomes narrower in the idling direction A of the outer ring 3 (see FIG. 1).

Each lube-oil receiving and accumulating part 25 is provided with inclined bottom wall portions 18, 19, which extend aslant toward the corresponding groove 17 from opposite angular ends of the lube-oil receiving and accumulating part 25. The inclined bottom wall 18 has a greater inclination than the inclined bottom wall 19. The inclined bottom wall 18 is inclined such that in the idling direction A of the outer ring 3, it becomes closer to the raceway surface on the inner periphery of the outer ring 3.

The grooves 16 are arranged on both of the axial end walls of the inner ring 2. Each groove 17 is, therefore, in communication with its corresponding grooves 16 at both of the axial end walls of the inner ring 2. The grooves extend from openings 40 of corresponding side plates 8. The arrangement of the grooves 16 on both of the axial end walls of the inner ring 2 makes it possible to effectively feed grease, which exists on the radially inner side of the inner ring 2, to the lube-oil receiving and accumulating parts 25 via the grooves 17. Accordingly, sufficient grease is accumulated in the lube-oil receiving and accumulating parts 25.

Third Embodiment

Figure 4:
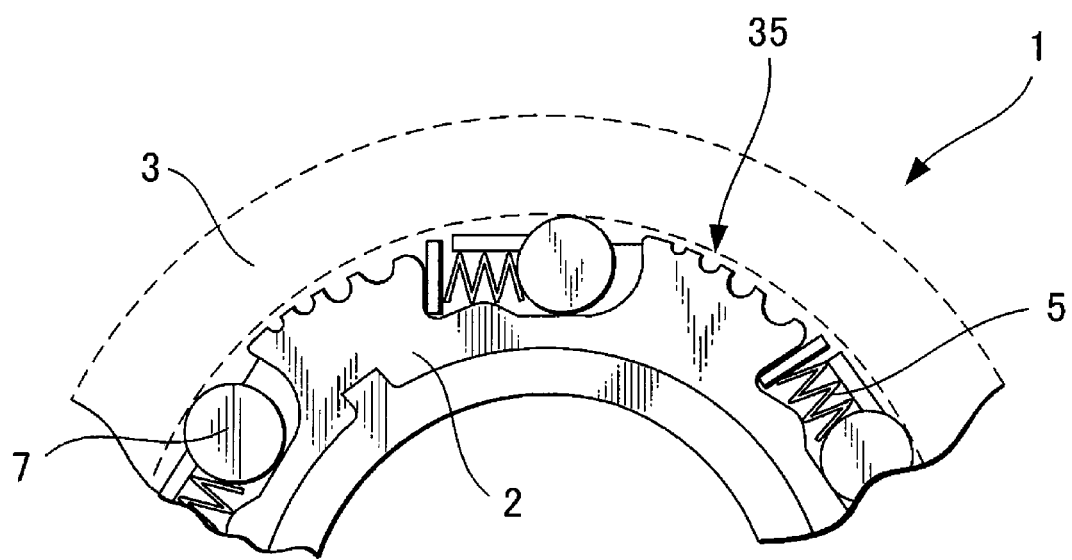
FIG. 4 is a fragmentary front view of a one-way clutch according to a third embodiment of the present invention.
Figure 5:
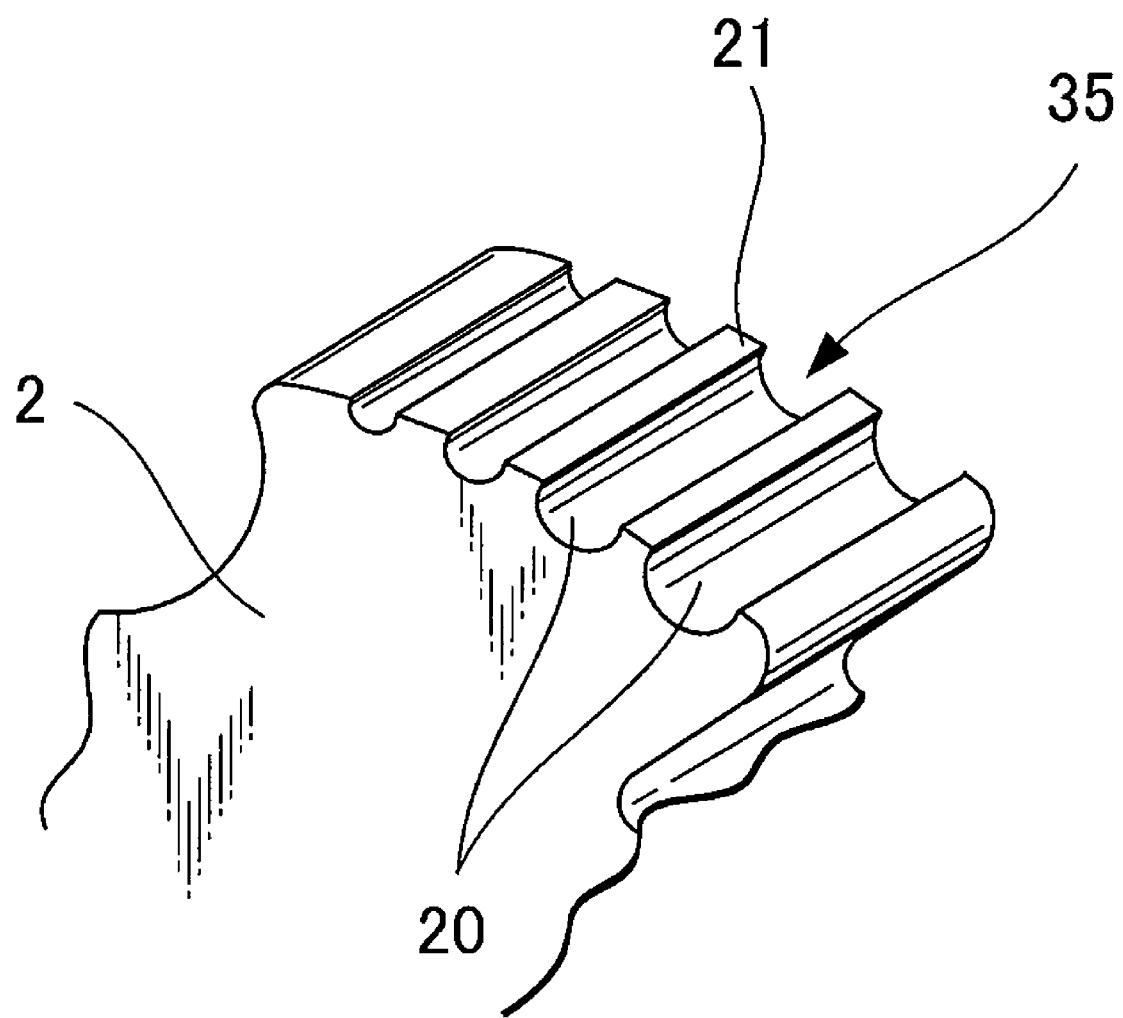
FIG. 5 is a fragmentary perspective view showing a grease receiving and accumulating part in FIG. 4.

Referring next to FIGS. 4 and 5, a one-way clutch according to a third embodiment of the present invention will be described.

In the third embodiment, each lube-oil receiving and accumulating part 35 is provided on a bottom wall thereof with plural grooves which extend in an axial direction to both of the axial end walls of the inner ring 2. As illustrated in the figures, each lube-oil receiving and accumulating part 35 having a wave form in cross-section is provided with four grooves 20 which extend in the axial direction. Between the respective grooves 20, ridge portions 21 are formed.

As clearly envisaged from FIGS. 4 and 5, the four grooves 20 are different in depth and opening width (as measured in the direction of the circumference of the inner ring 2). The last groove 20 in the idling direction A of the outer ring 3 is the smallest in both width and depth, while the first groove 20 in the idling direction A of the outer ring 3 is the largest in both width and depth.

According to the third embodiment, grease of sufficient film thickness can be retained in sliding areas between the respective rollers 7 and the raceway surface on the inner periphery of the outer ring 3 during idling of the one-way clutch 1, so that the cooling effect can be improved and grease can be filled in a greater amount owing to the increased space volume. These advantageous effects are hence expected to bring about an additional advantageous effect that the grease can be protected from heat degradation.

To each of the above-described embodiments, modifications can be made as will be described hereinafter. Firstly, grease was used as lube oil, but other lube oil can be used insofar as it has a similar degree of viscosity as grease.

Further, seals can be used to avoid a leakage of lube oil. In this modification, the side plates may be provided with sealing function, or as an alternative, discrete sealing members may be used.

In each of the embodiments described above, cylindrical rollers are referred to as rolling elements arranged in the pockets. The rolling elements can, however, be balls as disclosed in U.S. Pat. No. 6,279,708 assigned to the same assignee as in the present application, which is incorporated herein by reference.

In addition, the pockets are arranged at plural locations with angular intervals therebetween. The number of these pockets can be changed as desired depending on the torque capacity or the like to be needed. It is, however, preferred to arrange the pockets at equal angular intervals irrespective of the number of the pockets.

In each of the above-described embodiments, the lube-oil receiving and accumulating parts are arranged between the respective pockets. It is, however, unnecessary to arrange lube-oil receiving and accumulating parts between all the pockets.

This application claims the priority of Japanese Patent Application 2006-230214 filed Aug. 28, 2006, which is incorporated herein by reference.

The invention claimed is:

1. A one-way clutch comprising:

an outer ring having a cylindrical wall on an inner circumference thereof, an inner ring having pockets opening toward said cylindrical wall and forming cam surfaces therein, rolling elements arranged between said outer and inner rings and engageable between the cam surfaces and the cylindrical wall to perform transmission of a torque between said outer and inner rings, and springs received in said pockets and biasing said rolling elements, respectively, wherein said inner ring is provided on an outer circumferential wall thereof with lube-oil receiving and accumulating parts forming lube-oil receiving and accumulating recesses between said pockets to receive and accumulate lube oil, and wherein said lube-oil receiving and accumulating parts are inclined such that said lube-oil receiving and accumulating recesses become narrower in an idling direction of said outer ring to facilitate feeding of lube-oil from said lube-oil receiving and accumulating recesses into said pockets.

2. A one-way clutch according to claim 1, wherein said lube oil is grease.

3. A one-way clutch according to claim 1, wherein said inner ring is provided on opposite axial end walls thereof with grooves that extend from openings of corresponding side plates to said lube-oil receiving and accumulating parts, respectively.

4. A one-way clutch according to claim 1, wherein said lube-oil receiving and accumulating parts are each provided on a bottom wall thereof with plural axial grooves.

5. A one-way clutch according to claim 1, wherein said one-way clutch is provided with seals to prevent a leakage of said lube oil.

6. A one-way clutch according to claim 1, wherein said rolling elements are rollers.

7. A one-way clutch according to claim 1, wherein said rolling elements are balls.

* * * * *